United States Patent Office 3,720,042
Patented Mar. 13, 1973

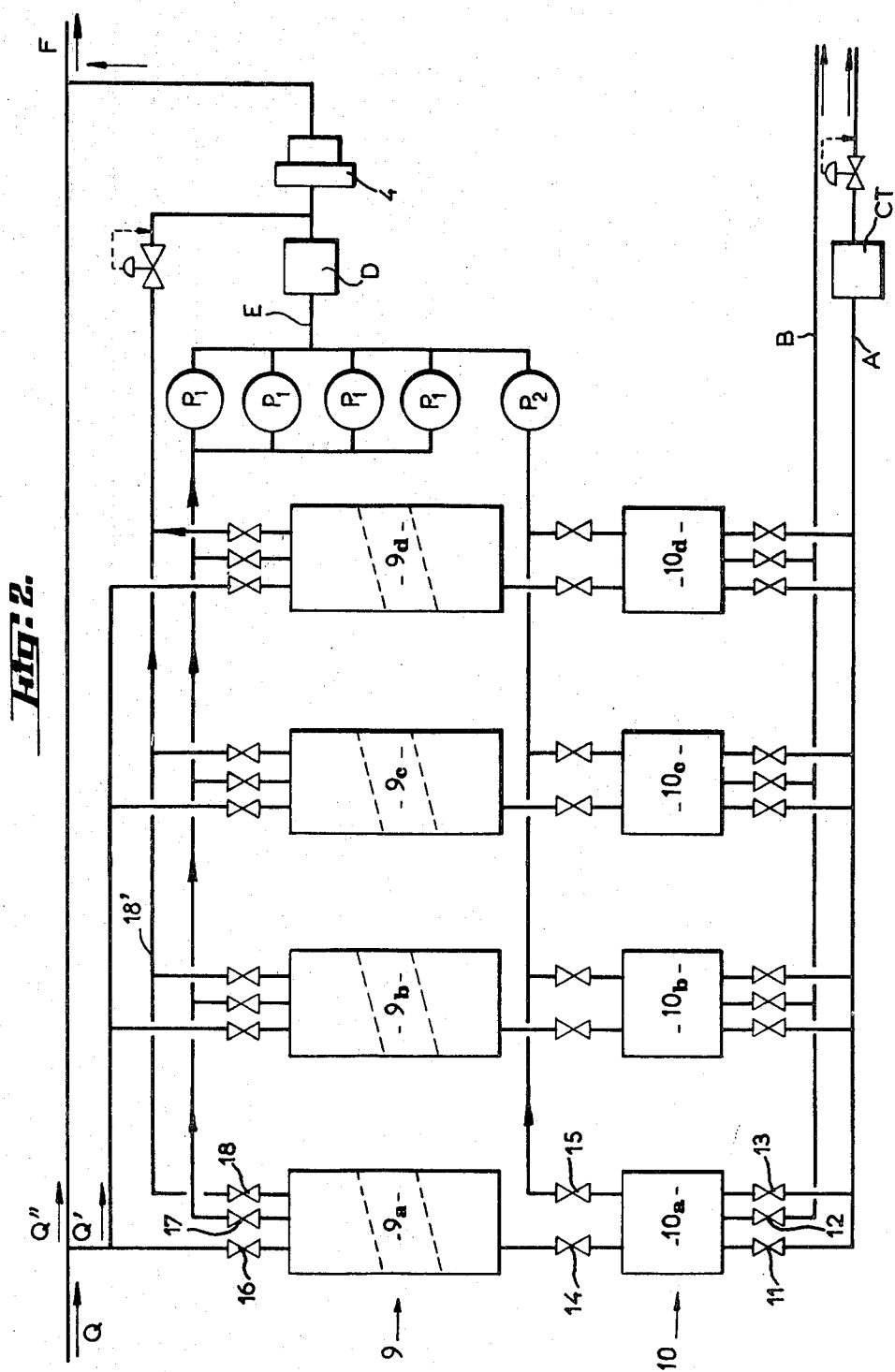

3,720,042
METHOD OF PRODUCTION OF PURE HYDROGEN AND MIXTURES CONTAINING HYDROGEN IN DEFINITE PROPORTIONS
Guy Simonet, Paris, France, assignor to L'Air Liquide, Societe Anonyme Pour l'Etude et l'Exploitation de Procedes Georges Claude, Paris, France
Filed July 12, 1971, Ser. No. 161,614
Claims priority, application France, July 16, 1970, 7026211
Int. Cl. B01d 53/04
U.S. Cl. 55—25
7 Claims

ABSTRACT OF THE DISCLOSURE

A method of production of hydrogen of high purity together with a mixture containing hydrogen and a second gaseous compound in definite molar proportions, from a gaseuos flow containing a preponderant content of hydrogen and the said second gaseous compound, in which a portion of the gaseous flow is subjected to a treatment for separation of the excess hydrogen, a gaseous fraction rich in the second gaseous compound being recovered and sent into the other portion of the said gaseous flow, the said separation treatment being effected by passing the said portion over at least one adsorption mass, the gaseous fraction rich in the second gaseous compound being recovered during the course of desorption of the said adsorption mass. The said second gaseous compound is carobn dioxide or nitrogen and the said portion of the flow is passed over at least two separate adsorption lines operating alternately. The invention also relates to an installation for carrying this method into effect.

The present invention has for its object a method and an installation for the treatment of gaseous flows containing a preponderant content of hydrogen, together with at least one second gaseous compound, for the purpose of production, on the one hand of hydrogen of high purity, and on the other hand of mixtures of hydrogen and the said second gaseous compound in definite molar proportions.

From a gaseous flow containing hydrogen in a preponderant content and a second gaseous compound, it is possible to produce a mixture having a definite molar proportion of hydrogen and the said other gaseous compound, by eliminating the excess hydrogen which is present in this initial gaseous flow.

The methods generally employed for achieving this result are well known. They consist particularly of washing methods, the physical phenomenon brought into action being an adsorption, or of methods of liquefaction based on the differences between the points of condensation of the various constituents of the gaseous flow.

These known methods have in fact a certain number of disadvantages. Thus, in the liquefaction method, the operation must be carried out at low temperatures, which necessitates large expenditure of energy, involves problems of heat insulation and causes complications with regard to the operation of the various installations. However, the main drawback of these known methods resides in the impossibility of collecting the hydrogen eliminated in a state of satisfactory purity. The method of elimination of hydrogen by liquefaction produces hydrogen having a purity of the order of 98%, which is a definitely insufficient degree of purity for a large number of applications.

Contrary to known methods and apparatus, the methods and installations according to the present invention do not furthermore present any inertia during starting-up, and have the advantage that they can easily be made automatic.

The present invention has for its object a method of production of hydrogen of high purity and of a mixture containing hydrogen and a second gaseous compound in definite molar proportions, obtained from a gaseous flow containing a preponderant content of hydrogen and the said second gaseous compound, in which a part of this gaseous flow is subjected to a treatment for separation of the excess hydrogen, a gaseous fraction rich in the said second gaseous compound being recovered and sent into the other part of the gaseous flow, this method being characterized in that the said treatment is carried out by passing the said part over at least one adsorption mass, the gaseous fraction rich in the said second compound being recovered during the course of the desorption of the said adsorption mass.

The present invention also has for its object a method in which the said treatment is carried out by passing the said part of the flow over at least two separate adsorption lines which work alternately. Each line preferably comprises at least one initial adsorption zone and one final adsorption zone, the said gaseous mixture being recovered by regeneration of the masses, with desorption by de-pressurization and putting under vacuum at different residual pressures, the final zone being regenerated under a vacuum higher than that of the initial zone.

The method according to the present invention is espeically applicable to the treatment of flows of hydrogen and carbon monoxide or flows of hydrogen and nitrogen, for the purpose of preparation of hydrogen of high purity and of mixtures respectively of hydrogen and carbon monoxide, suitable for example for hydroformylation reactions and of hydrogen and nitrogen, suitable for example for the preparation of ammonia.

According to one form of embodiment of the invention, the adsorption is carried out in two stages at different pressures, one during the course of isobaric operation of the adsorption zone, the other during the course of the first part of the expansion operation.

The present invention also has for its object an installation for the production of pure hydrogen and mixtures of hydrogen with a second gaseous compound, characterized in that it comprises a branch circuit on a main conduit, on which branch circuit are arranged an adsorption line and at least one apparatus for producing a vacuum.

According to one form of embodiment of this installation, at least two adsorption lines, composed of adsorbers in series, are arranged on the said branch circuit, the said series comprising at least one initial adsorber and a final adsorber in the direction of adsorption. The input extremity of each adsorber in the direction of adsorption is preferably connected to the vacuum-producing apparatus, consisting respectively of a battery of vacuum pumps connected in parallel for the initial adsorber, and of one or a number of vacuum pumps enabling a higher vacuum to be obtained in the final adsorber.

Other objects and advantages of the present invention will become apparent from the description which follows below, reference being made to the accompanying drawings, given in a non-limitative sense, and in which:

FIG. 2 shows a detailed view of the part of FIG. 1 which bears the reference No. 3.

Figure 1:
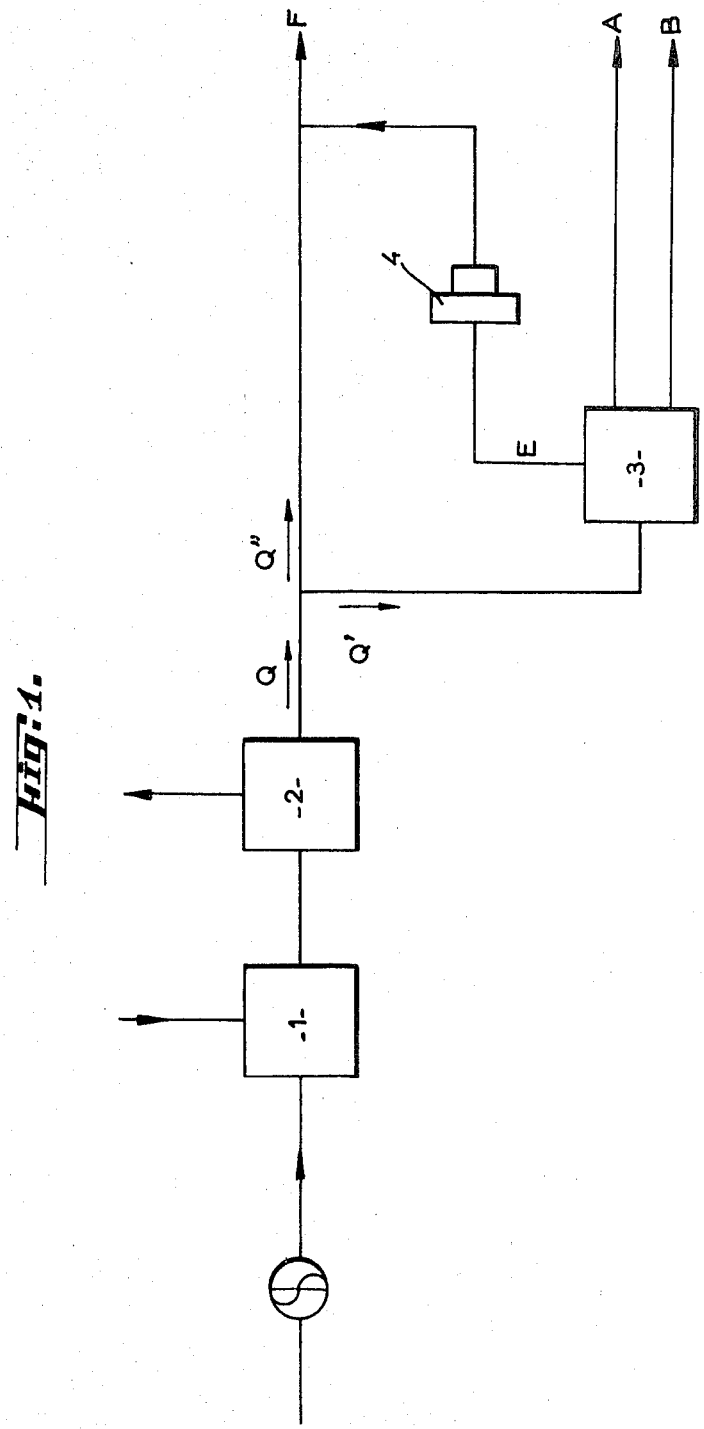
FIG. 1 shows a diagram of an installation for the production of pure hydrogen and a mixture of carbon monoxide and hydrogen in definite proportions, from a natural gas or a naphtha.

In the installation of FIG. 1, the raw starting material (natural gas or naphtha) is treated by re-forming with steam in an oven 1 under a certain pressure (from 15 to 30 bars for example), the regulation being effected in such manner as to obtain, at the outlet of this oven, a low content of $N_2$ and $CH_4$. After cooling, the gaseous mixture obtained is decarbonated by washing in a unit 2.

At the outlet of this unit 2, this mixture has the following approximate composition:

| | |
|---|---|
| $H_2$ | 70 to 75%. |
| CO | About 25%. |
| $CH_4+N_2$ | About 2%. |

A portion Q' of this gas (still under pressure) is then treated in an adsorption unit 3 at ambient temperature so as to extract part of the hydrogen in the flow Q, this portion being in excess with respect to the CO in order to obtain the $H_2$/CO ratio corresponding to the desired ratio.

The hydrogen could be extracted in two fractions, a fraction A at high purity (only a few multiples of 10 v.p.m. of impurities with $CO+CO_2=10$ v.p.m.) and under a pressure in the vicinity of that of the flow Q, and a fraction B of lower purity (99.5% for example) available at a lower pressure, of a few bars for example.

The residuaries extracted from this adsorption unit 3 (and containing practically all the CO present in the flow Q') are recovered at E at atmospheric pressure and are re-compressed at 4 so as to be mixed with the untreated portion Q'' in the unit 3.

The desired mixture $H_2+CO$ is thus available at F at a pressure very close to that of the re-forming oven, the efficiency in CO being very close to 100%.

The adsorption unit 3 is shown in FIG. 2. This installation comprises four lines of two adsorbers 9 and 10 (respectively 9a, 9b, 9c, 9d and 10a, 10b, 10c, 10d).

The first line 9 contains layers of three different adsorbents: alumina, activated carbon, zeolite 5A, which retain humidity, methane and the greater part of the nitrogen and carbon monoxide.

The second line 10 contains zeolite 5A and permits completion of the retention of the remaining nitrogen and carbon monoxide.

This division into two adsorbers 9 and 10 makes it possible to regenerate the first adsorber under only a moderate vacuum, whereas the second adsorber is regenerated under the vacuum necessary for the production of pure gas.

These two vacua are obtained:

By four pumps $P_1$ coupled together in parallel for the first column;
By a single pump $P_2$ for the second column.

These adsorbers 9 and 10 treat only the part of the mixture necessary for the elimination of the desired quantity of hydrogen. The impurities, including the carbon monoxide, are collected and re-compressed by a compressor 4 and then mixed with the inlet gas which has not been treated.

On the extraction of pure hydrogen, a buffer tank CT ensures the continuity of the supply during the time of operation of the valves. The buffer tank D plays the same part for the mixture of hydrogen and carbon monoxide produced.

As the isothermal adsorption cycle is divided into four stages, the operation of the adsorption cycle is as follows:

STAGE I

Raising the impurities front in the line of two adsorbers by the introduction of pure hydrogen through the "extraction" extremities of the columns up to 15 bars (pure hydrogen taken from the downstream buffer tank CT—valves 11 and 14 open, valves 12, 13, 15, 16, 17 and 18 closed);

STAGE II

Admission of the gas to be separated to the two adsorbers, and simultaneous isobaric extraction of pure hydrogen at a pressure of 15 bars (valves 16, 14 and 13 open, valves 11, 12, 15, 17 and 18 closed);

STAGE III

This stage is divided into two parts:
(a) Expansion down to an intermediate pressure (valves 14 and 12 open, valves 11, 13, 15, 16, 17 and 18 closed), permitting the production of hydrogen of lower purity;

(b) The remainder of this expansion down to atmospheric pressure, with recovery of the gas to be sent to the treatment compressor of the recovered mixture through the conduit 18' (valves 14 and 18 open, valves 11, 12, 13, 15, 16 and 17 closed);

STAGE IV

Regeneration of the two adsorbers under vacuum. The first adsorber is coupled to four pumps, ensuring a vacuum of the order of 10 mm. in the column, while the second adsorber is coupled to a pump providing a vacuum of the order of 1 mm. (valves 17 and 15 open, valves 11, 12, 13, 14, 16 and 18 closed). The delivery of the pumps is coupled to the inlet of the recovery compressor 4 for the residuaries.

The operation of the installation shown in FIG. 2 is such that, while for example the Stage I is produced on the line of adsorbers 9a–10a, Stage II takes place on the line of adsorbers 9b–10b, Stage III on the line of adsorbers 9c–10c and Stage IV on the line of adsorbers 9d–10d.

These lines of adsorbers will of course be operated by switching over in such manner that one of the adsorbers is always working on adsorption, and there is thus obtained a continuous production of pure hydrogen and the desired mixture. For the sake of clearness, the four stages will now be studied below with reference to a single line of adsorption.

By way of example, there is described below the operation of an adsorption unit at ambient temperature according to the present invention, for the production of an equimolar mixture of hydrogen and carbon monoxide.

The starting product is a flow Q of 25,321 Nm.³ per hour of a mixture at 15 bars, containing:

| | Percent |
|---|---|
| $H_2$ | 71.7 |
| CO | 24.9 |
| $CH_4$ | 3.2 |
| $N_2$ | 0.2 |

A portion Q' of this mixture, equal to 18,365 Nm.³ per hour is led into the unit 3. There is extracted through the valve 13 and the conduit A, about 6,500 Nm.³ of pure hydrogen (less than 10 v.p.m. of CO) in accordance with Stage II. An expansion is then carried out down to a pressure corresponding to the elimination of 5,400 Nm.³ per hour apart from the production of 6,500 Nm.³ per hour recovered in Stage II, and this expansion is completed down to atmospheric pressure (Stage II). These 5,400 Nm.³ per hour are available at 1 atm. in the conduit B, while the fraction enriched in carbon monoxide leaves the adsorber 9a through the valve 18 and the conduit 18'.

The two adsorbers are then regenerated under vacuum (Stage IV) and at E there is available 6,465 Nm.³ per hour of a mixture containing:

| | Percent |
|---|---|
| $H_2$ | 20.4 |
| CO | 70.7 |
| $CH_4+N_2$ | 8.9 |

These 6,465 Nm.³ per hour of mixture are recompressed to 15 atm. so as to be mixed with the portion Q'', not treated in the unit 3 and equal to 6,956 Nm.³ per hour.

The mixture F obtained by combining the two flows consists of 13,421 Nm.³ per hour, available at 15 atm., containing about 46.8% of CO and about 46.8% of $H_2$.

The total expenditure of energy is of the order of 1600 kw. per hour, divided into 700 kw. per hour for the vacuum pumps and 900 kw. per hour for the treatment compressor of the mixture of hydrogen and carbon monoxide.

It will of course be understood that the present invention is not in any way limited to the forms of embodiment described and shown, but is capable of receiving numerous other alternatives available to those skilled in the art, according to the applications contemplated, and without thereby departing from the spirit of the invention.

What I claim is:

1. A method for the production of (a) a hydrogen stream of high purity and (b) a stream of a mixture containing a predetermined molar ratio of (c) hydrogen and (d) a second gaseous compound, from (k) a gaseous flow containing a preponderance of hydrogen (c) and the remainder substantially consisting of said second gaseous compound (d), comprising the steps of:

separating said gaseous flow (k) into (e) a first portion and (f) a second portion;

passing said first portion (e) into at least one adsorption line comprising an initial adsorption zone and a final adsorption zone to separate hydrogen of high purity (a) from (g) a gaseous fraction rich in said second gaseous compound by adsorption;

recovering said gaseous fraction rich in said second gaseous compound (g) by regeneration of said adsorption zones with desorption by de-pressurization under vacuum pressure wherein said final adsorption zone is regenerated under a higher vacuum than is said initial zone;

bringing said recovered gaseous fraction rich in said second gaseous compound (g) to the pressure of said second portion (f) of said gaseous flow (k); and mixing said recovered gaseous fraction (g) with said second portion (f), wherein the ratio of said first portion (e) and said second portion (f) of said gaseous flow (k) is predetermined such that the end product of said mixing step (b) will contain said predetermined molar ratio of hydrogen (c) and said second gaseous compound (d).

2. A method in accordance with claim 1 wherein said hydrogen of high purity (a) comprises two streams wherein (h) the first stream comprises hydrogen of high pressure and high purity and (i) the second stream comprises hydrogen of lower pressure and purity than said first stream (h) and further wherein said adsorption takes place in two stages at different pressures wherein the first stage comprises an isobaric operation of the adsorption line to produce said first stream (h) and the second stage comprises operation during expansion, wherein said isobaric pressure is lowered to a pressure above atmospheric to produce said second stream (i).

3. A method in accordance with claim 1 wherein said initial adsorption zone comprises layers of alumina, activated carbon and zeolite and said final adsorption zone comprises zeolite.

4. A method as claimed in claim 1, in which said passing step is effected by passing said first portion (a) of the flow over at least two separate adsorption lines acting in alternate operation.

5. A method as claimed in claim 2, in which a raising of the impurities front is effected following the said recovering step and preceding said first adsorption stage.

6. A method as claimed in claim 1, in which said second gaseous compound (d) is carbon dioxide.

7. A method as claimed in claim 1, in which said second gaseous compound (d) is nitrogen.

References Cited
UNITED STATES PATENTS

| | | | |
|---|---|---|---|
| 3,638,398 | 2/1972 | Domine | 55—25 |
| 3,619,984 | 11/1971 | Domine et al. | 55—25 |
| 3,258,896 | 7/1966 | Muller | 55—19 |
| 2,992,703 | 7/1961 | Vasan et al. | 55—75 |
| 3,252,268 | 5/1966 | Stark | 55—25 |
| 3,343,916 | 9/1967 | Cahn et al. | 55—62 |

CHARLES N. HART, Primary Examiner

U.S. Cl. X.R.
55—62, 75